(12) United States Patent
Livvix (10) Patent No.: US 9,462,761 B2
(45) Date of Patent: Oct. 11, 2016

(54) DISTRIBUTION SYSTEM AND METHOD

(71) Applicant: Charles Tyler Livvix, Andover, KS (US)

(72) Inventor: Charles Tyler Livvix, Andover, KS (US)

( * ) Notice: Subject to any disclaimer, the term of this patent is extended or adjusted under 35 U.S.C. 154(b) by 0 days.

(21) Appl. No.: 13/892,247

(22) Filed: May 11, 2013

(65) Prior Publication Data

US 2014/0064852 A1    Mar. 6, 2014

Related U.S. Application Data

(60) Provisional application No. 61/795,968, filed on May 11, 2012.

(51) Int. Cl.
*A01G 25/06* (2006.01)
*B65G 5/00* (2006.01)

(52) U.S. Cl.
CPC .................. *A01G 25/06* (2013.01); *B65G 5/00* (2013.01); *Y10T 137/794* (2015.04); *Y10T 137/8593* (2015.04); *Y10T 137/86035* (2015.04)

(58) Field of Classification Search
USPC ....... 405/51, 80, 53; 137/561 R, 565.17, 544
See application file for complete search history.

(56) References Cited

U.S. PATENT DOCUMENTS

| | | | | |
|---|---|---|---|---|
| 4,188,154 A * | 2/1980 | Izatt | ..................... | E02B 11/005 405/38 |
| 4,538,377 A * | 9/1985 | Thornton | ............... | A01G 25/06 405/39 |
| 5,059,064 A * | 10/1991 | Justice | ............................ | 405/37 |
| 5,848,856 A * | 12/1998 | Bohnhoff | ........................ | 405/36 |
| 7,862,713 B2 * | 1/2011 | Justice | .................... | C02F 1/004 210/170.09 |
| 2007/0031192 A1 * | 2/2007 | Murfin | ............................ | 405/43 |
| 2010/0092240 A1 * | 4/2010 | Glasser | .................. | A01G 1/002 405/38 |
| 2011/0008105 A1 * | 1/2011 | Soergel | .................. | A01G 25/02 405/43 |
| 2013/0074408 A1 * | 3/2013 | Singh | ..................... | A01G 31/02 47/62 E |

* cited by examiner

*Primary Examiner* — Benjamin Fiorello
*Assistant Examiner* — Kyle Armstrong
(74) *Attorney, Agent, or Firm* — Kenneth H. Jack; Davis & Jack, L.L.C.

(57) ABSTRACT

A distribution system and method for simultaneously distributing and reclaiming a liquid with a single, multi-directional system pathway. The system pathway follows a circuitous path for both receiving liquid from and returning reclaimed liquid to a reservoir positioned beneath a ground surface. A distribution pathway, such as a pipe, may carry the liquid with pressure from the reservoir to a distribution outlet. A reclamation pathway, such as a perforated pipe, may encapsulate the distribution pathway, and capture runoff and excessive liquid through at least one aperture for returning the liquid back to the reservoir. In some embodiments, the system pathway may include one perforated pipe that forms a barrier between the distribution pathway and the reclamation pathway. A film may cover the perforations to allow for pressurizing the water. A system of pumps, valves, and a control apparatus help regulate the liquid.

5 Claims, 10 Drawing Sheets

DISTRIBUTION SYSTEM AND METHOD

CROSS-REFERENCE TO RELATED APPLICATIONS

The present Utility patent application claims priority benefit of the [U.S. provisional application for patent Ser. No. 61/795,968, entitled "Irrigation and Drainage Pipe Construction, System and Method of Making Same", filed on May 11, 2012 under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to a liquid distribution system and method. More particularly, the invention relates to an irrigation, drainage, and collection system that reuses the same liquid.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that irrigation is the artificial application of water to the land or soil. Irrigation is used to assist in the growing of agricultural crops, maintenance of landscapes, and revegetation of disturbed soils in dry areas and during periods of inadequate rainfall. Additionally, irrigation also has a few other uses in crop production, which include protecting plants against frost, suppressing weed growing in grain fields and helping in preventing soil consolidation.

Often, commercial and residential irrigation systems are buried in the ground. The pipes, sprinklers, drippers, and irrigation valves being hidden, provides a cleaner, more presentable landscape without garden hoses or other items having to be moved around manually.

Typically, sources of irrigation water can be groundwater extracted from springs or by using wells, surface water withdrawn from rivers, lakes or reservoirs or non-conventional sources like treated wastewater, desalinated water or drainage water.

Typically, a pipe is a tubular section or hollow cylinder, usually but not necessarily of circular cross-section, used mainly to convey substances which can flow, such as liquids, gases, slurries, powders, masses of small solids.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

The present invention will now be described in detail with reference to embodiments thereof as illustrated in the accompanying drawings.

There are various types of liquid distribution systems that may be provided by preferred embodiments of the present invention. In one embodiment of the present invention, the distribution system may provide a single, multi-directional system pathway that simultaneously distributes and reclaims a liquid, while following a circuitous path for both receiving liquid from and returning reclaimed liquid to a reservoir positioned beneath a ground surface. In some embodiments, each function of distribution and reclamation occurs in a separate pathway. Each pathway may join together to form a single, multi-directional system pathway that runs coextensively, forming a substantially circuitous path. However, in other embodiments, one pathway having a larger diameter may encapsulate the other pathway to form the system pathway, with each pathway performing a distinct function. Each pathway may carry the liquid in opposite directions, for distribution and reclamation. In some embodiments, the system pathway may position beneath a ground surface. Although it may not be economically beneficial, some embodiments may implement a system comprising three or more pipes that may provide drainage and distribution/pressure in one system, regardless of the number of individual extrusions.

In one embodiment of the present invention, a distribution pathway may perform the liquid distribution function. The distribution pathway may include a fully enclosed tube operable to pressurize and carry the liquid. The distribution pathway may include, without limitation, a 6" to 10" recycled low density polyethylene pipe. If possible, include different types of the commodity or economical plastics, there are less than 10. For example: polypropylene (PP), polyethylene Terephthalate (PET), low, medium and high density PE (LDPE, MDPE, HDPE), crosslinked polyethylene (PEX or XLPE), polystyrene (PS), polyvinylchloride (PVC), acrylonitrile butadiene styrene (ABS), Nylon 6 and 6.6 (PA 6, PA6.6), Polycarbonate (PC), Poly Lactic Acid (PLA), Drainage pipe is generally high density polyethylene, pressure pipe is as well. The distribution pathway may initiate at a reservoir configured to contain the liquid. At least one pump may pressurize the liquid to pass through the distribution pathway. In some embodiments, the distribution pathway may distribute the liquid above the ground surface. The reservoir may include, without limitation, an underground aquifer, a pool, a tank, a lake, and a river. In some embodiments, at least one valve may regulate the liquid inside the distribution pathway. A pump may force the liquid through the distribution pathway. In some embodiments, the system may run with gravity or may pressurize a drip tube/tape. Some embodiments can be used to fill a tank on the high side of a field and may be pressurized by gravity.

In one embodiment of the present invention, a reclamation pathway may perform the liquid reclamation function. The reclamation pathway may encapsulate the distribution pathway, whereby each pathway performs a distinct function separate from the other. The reclamation pipe is typically perforated so that water may originate from the dirt surrounding the drainage/reclamation pipe. In some embodiments the drainage/reclamation pipe could completely surround the distribution pipe. Some embodiments may also include, without limitation, an inflatable pipe as well. This inflatable pipe can utilize the strength of a surrounding plastic pipe when inflated, which may allow for a thinner, and potentially cheaper, distribution/pressure pipe. In some embodiments, the reclamation pathway may include a plurality of apertures for receiving the liquid from above the surface. The reclamation pathway may also receive the liquid overflow from the distribution pathway. In some embodiments, the reclamation pathway may include an empty, unpressurized tube configured to carry the liquid back to the reservoir. Those skilled in the art, in light of the present teachings, will recognize that the reclamation pathway may be inclined to allow gravity to help move the liquid to the reservoir. The reclamation pathway may include, without limitation, a 6" to 10" high density polyethylene pipe. In some embodiments, an end cap may be configured to join co-terminating ends of the distribution pathway and the reclamation pathway.

Figure 1:
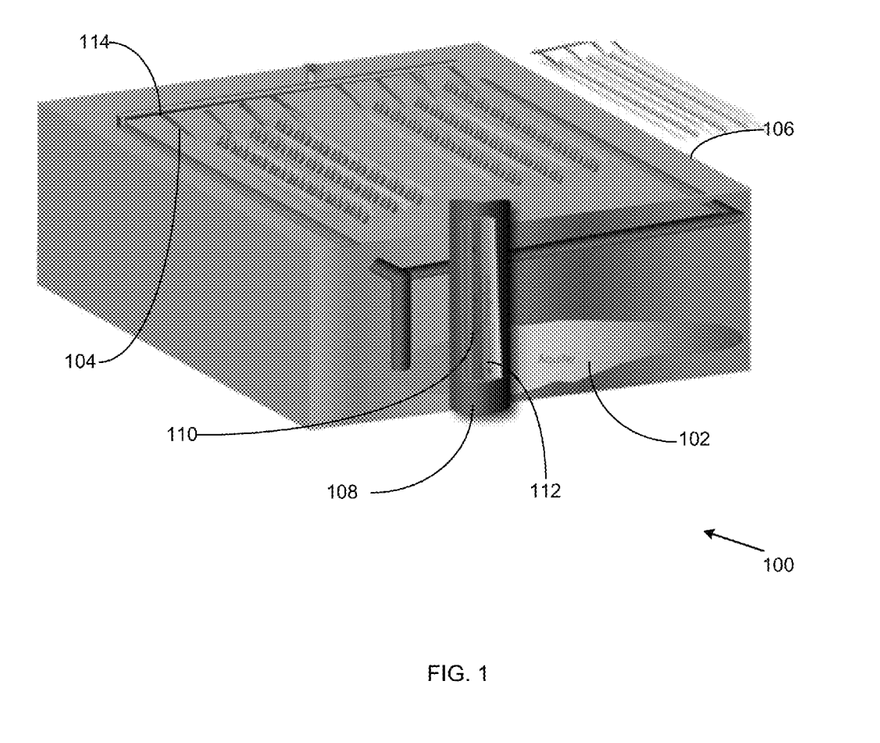
FIG. 1 illustrates a detailed perspective view of an exemplary distribution system, in accordance with an embodiment of the present invention.

FIG. 1 illustrates a detailed perspective view of an exemplary distribution system, in accordance with an embodiment of the present invention. In the present embodiment, the distribution system may provide a circuitous path of irrigation pipes that carry irrigation liquid to and from an underground reservoir. The system may include a multi-directional pathway that forms a circuitous path for reusing the liquid from the reservoir. The distribution system may include, without limitation, an irrigation system, a high pressure sprinkler system, a golf course watering system, a sewer system, a home water system, a system for providing water from a well to a home water distribution system, etc. Some embodiments may be used in drip, surge, flood, and furrow irrigation; in addition, a center pivot irrigator may be fed with this system.

In one embodiment of the present invention, a distribution system 100 may include a system pathway 108 for carrying a liquid 104 in a circuitous path from a reservoir 102 positioned beneath a ground surface 106 to a distribution outlet 114 positioned above the ground surface, and then recapture the liquid for reuse in the reservoir. The system may follow various different types of paths. For example, without limitation, the system may include without limitation, an individual pipe to be pressurized for all the various types of irrigation. Alternately, the system may be able to take water from a drainage system or store underground such as, but not limited to, aquifer storage or recharge, for later use for an irrigation or potable water system. A distribution pathway 110 may carry the liquid under pressure from the reservoir to a desired area for distribution. A reclamation pathway 112 may join the distribution pathway to form a unitary, multi-directional pathway for capturing and returning the liquid back to the reservoir for reuse.

Figure 2A:
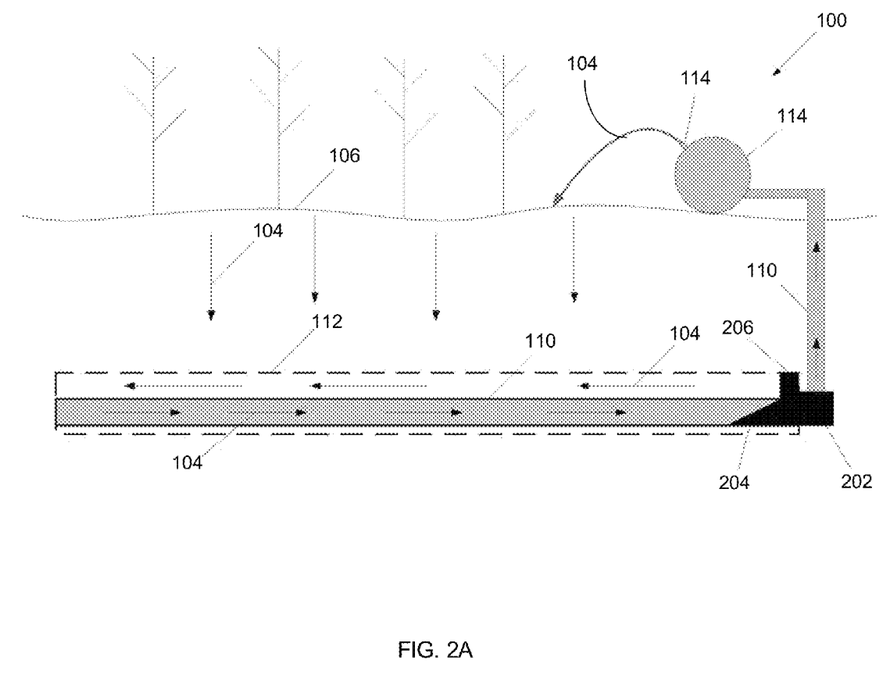
FIGS. 2A, 2B, and 2C illustrate system diagrams for exemplary distribution systems, in accordance with an embodiment of the present invention.
Figure 2B:
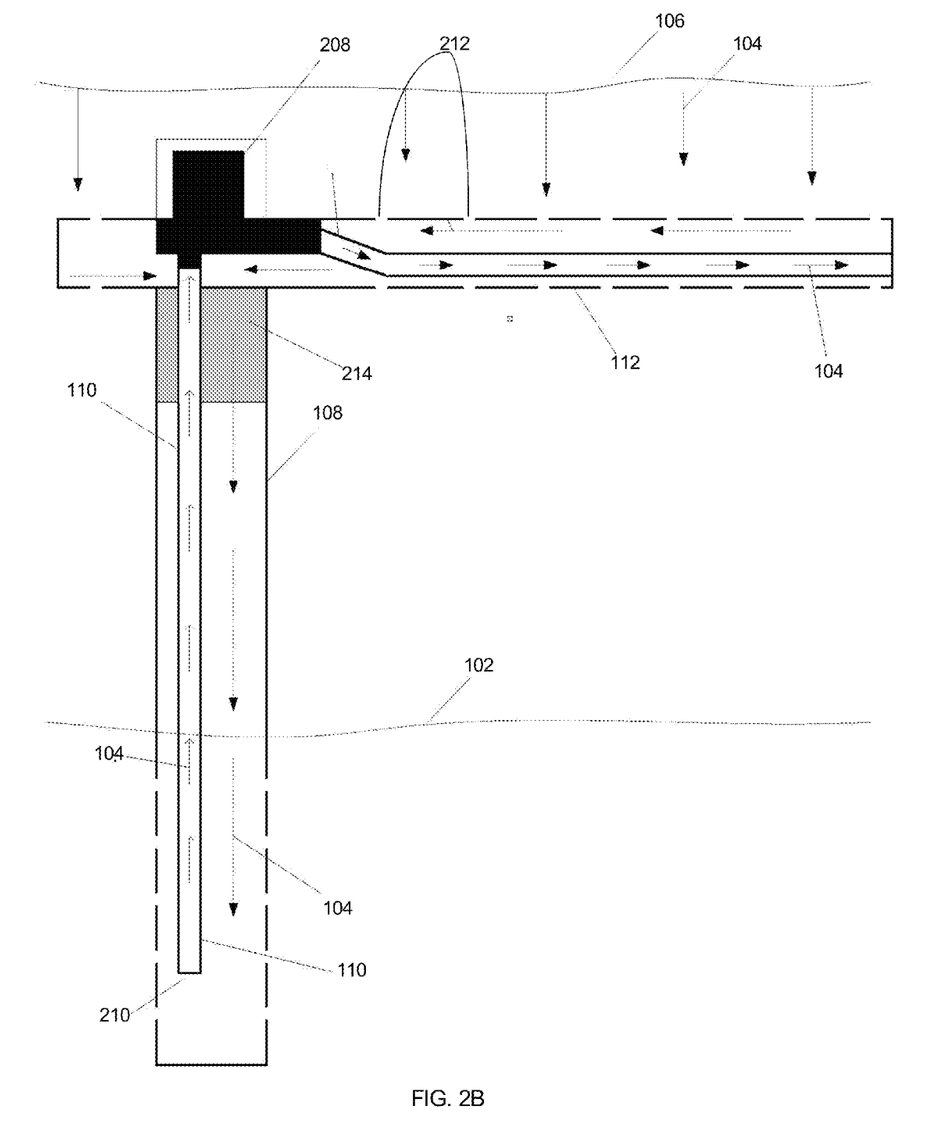
Figure 2C:
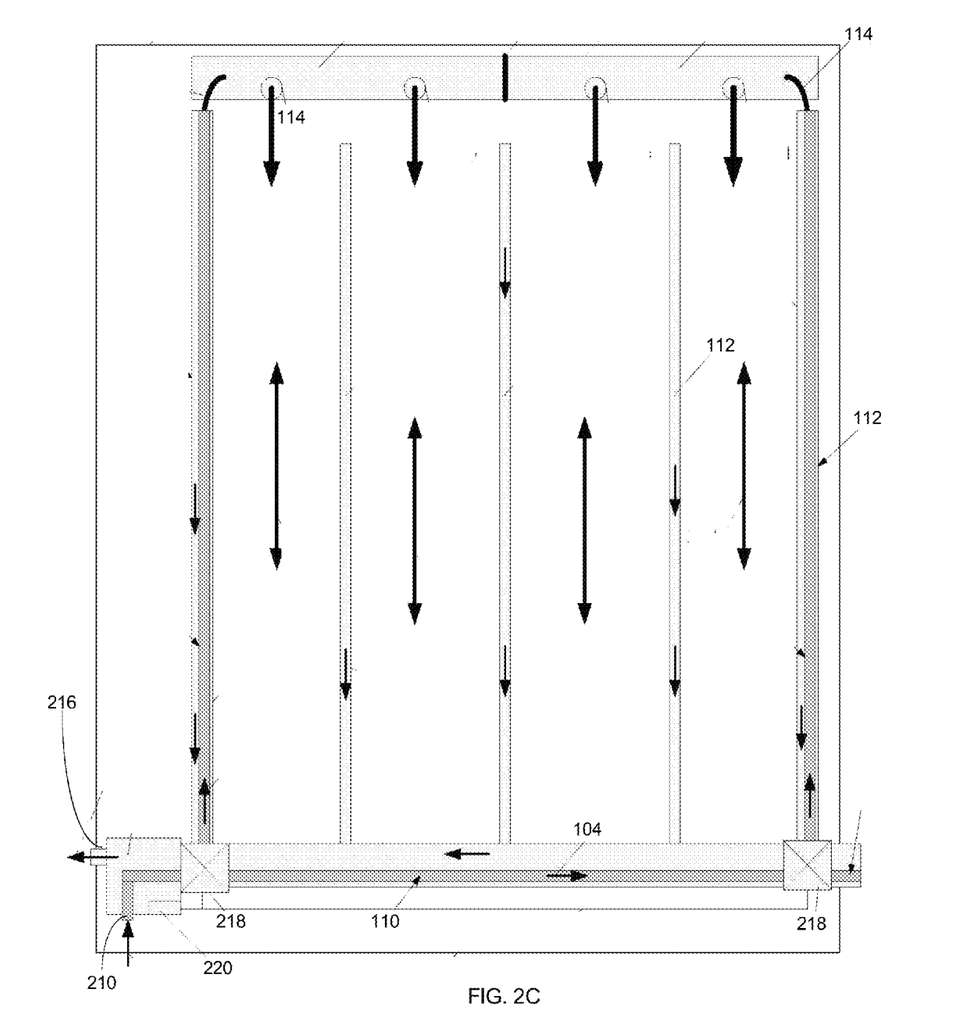

FIGS. 2A, 2B, and 2C illustrate system diagrams for exemplary distribution systems, in accordance with an embodiment of the present invention. In the present embodiment, the distribution system may include a single, multi-directional system pathway that simultaneously distributes and reclaims a liquid, while following a circuitous path for both receiving liquid from and returning reclaimed liquid to a reservoir positioned beneath a ground surface. In some embodiments, each function of distribution and reclamation occurs in a separate pathway. Each pathway may join together to form a single, multi-directional system pathway that runs coextensively, forming a substantially circuitous path. However, in other embodiments, one pathway having a larger diameter may encapsulate the other pathway to form the system pathway, with each pathway performing a distinct function. Each pathway may carry the liquid in opposite directions, for distribution and reclamation. In some embodiments, the system pathway may position beneath a ground surface. In some embodiments, an end cap 202 may join co-terminating ends of the distribution pathway and the reclamation pathway. A coupler may join the pathways, and includes an interface 204 with each pathway. A cap portion 206 may close off a downstream end of the system pathway.

In one embodiment of the present invention, the distribution pathway may include, without limitation, a 6" to 10" recycled low density polyethylene pipe. However, the pipe may be fabricated from other materials, including, without limitation, polyvinyl chloride, metal, high density polymers, various different types of plastics, etc. In some embodiments, the distribution pathway may flex to conform to the pressurized liquid. The distribution pathway may initiate at a reservoir configured to contain the liquid. At least one pump 208 may pressurize the liquid to pass through the distribution pathway. In some embodiments, the distribution pathway may distribute the liquid above the ground surface. The reservoir may include, without limitation, an underground aquifer, a pool, a tank, a lake, and a river. In some embodiments, at least one valve may regulate the liquid inside the distribution pathway. The at least one pump may force the liquid through the distribution pathway. An inlet portion 210 may join the distribution pathway with the reservoir. In some embodiments, at least one valve 218 may regulate the liquid inside the distribution pathway. A control apparatus 220 may serve to operate the valves, pumps, and inlets for the system.

In one embodiment of the present invention, a reclamation pathway may perform the liquid reclamation function. The reclamation pathway may encapsulate the distribution pathway, whereby each pathway performs a distinct function separate from the other. In some embodiments, the reclamation pathway may include a plurality of apertures 212 for receiving the liquid from above the surface. The plurality of apertures may include equidistant perforations configured to receive runoff liquid, yet also restrict access to debris. The reclamation pathway may also receive the liquid overflow from the distribution pathway. In some embodiments, the reclamation pathway may include an empty, unpressurized tube configured to carry the liquid back to the reservoir. A drainage outlet 216 may provide a release for excess liquid. For example, without limitation, flood irrigation water seeps through the soil as drainage water, enters reclamation pathway through the at least one aperture, and is conducted away from the cultivated area towards the reservoir. In some embodiments, a filter portion 214 may help purify the liquid prior to distribution. The filter portion may include, without limitation, a carbon filter.

Those skilled in the art, in light of the present teachings, will recognize that the reclamation pathway may be inclined to allow gravity to help move the liquid to the reservoir. The reclamation pathway may include, without limitation, a 6" to 10" high density polyethylene pipe. However, the pipe may be fabricated from other materials, including, without limitation, polyvinyl chloride, metal, and low density polymers. In some embodiments, an end cap may be configured to join co-terminating ends of the distribution pathway and the reclamation pathway. A drainage outlet may allow excess liquid to be released from the reclamation pathway.

Figure 3A:
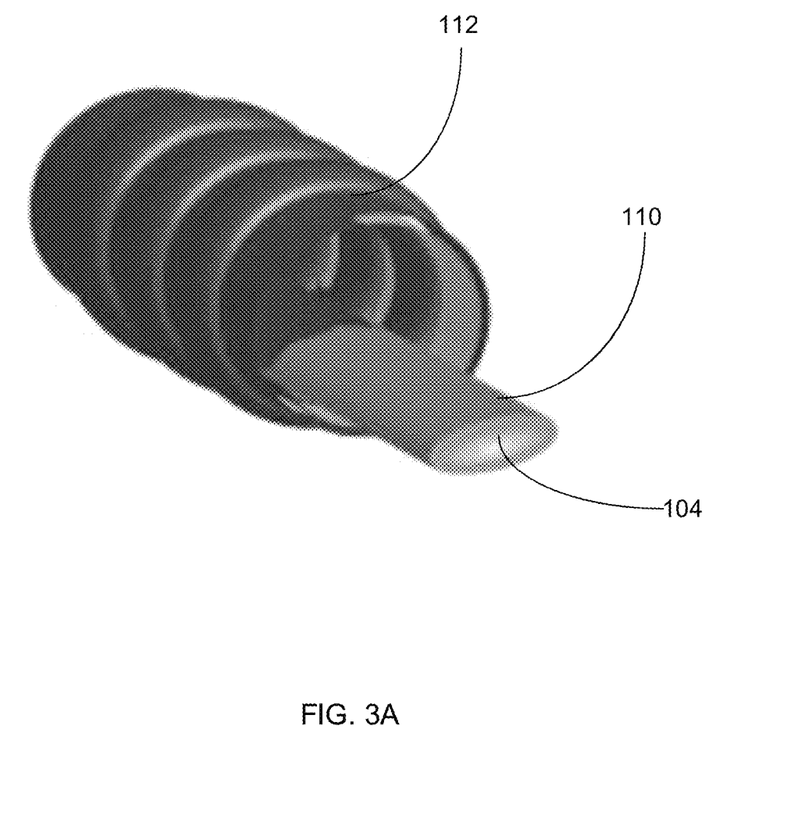
FIGS. 3A and 3B illustrate a side view and a detailed perspective view of an exemplary distribution pathway encapsulated by an exemplary reclamation pathway, in accordance with an embodiment of the present invention.
Figure 3B:
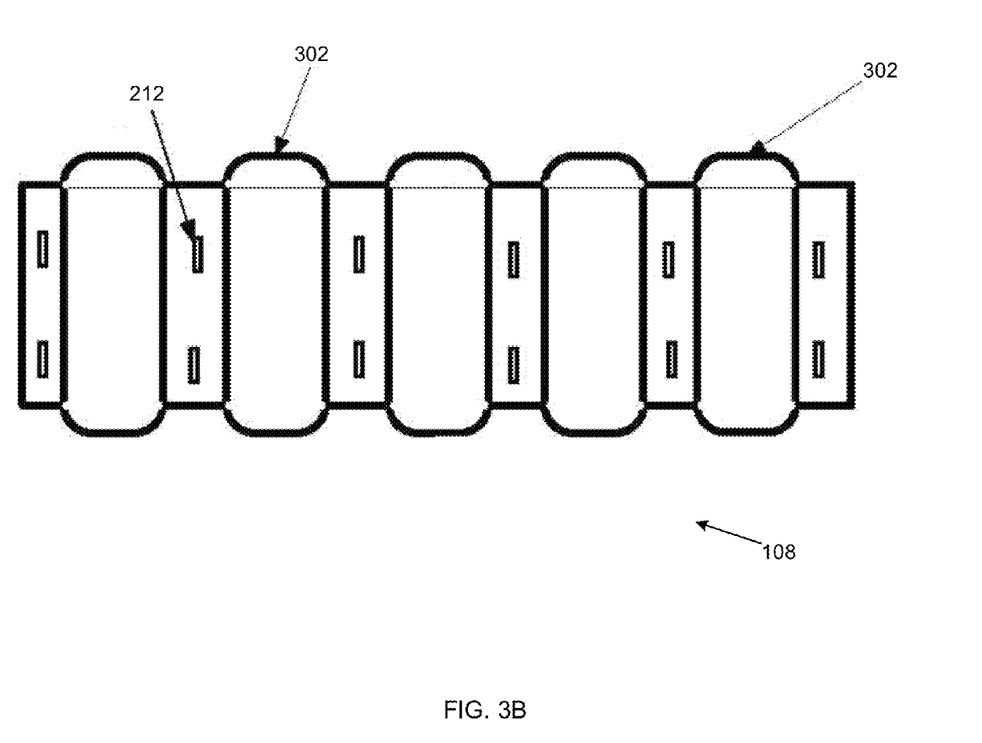
Figure 4A:
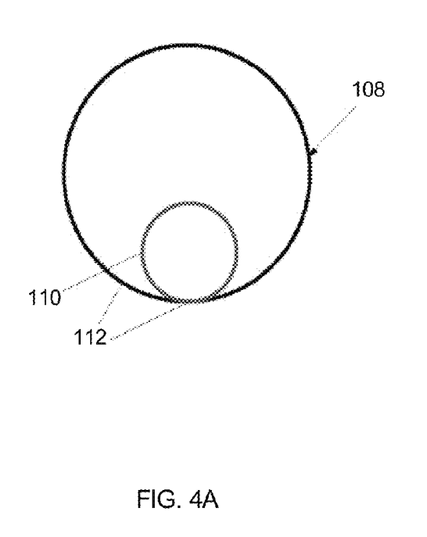
FIGS. 4A, 4B, 4C, and 4D illustrate sectioned views of an exemplary distribution pathway encapsulated by an exemplary reclamation pathway, in accordance with an embodiment of the present invention.
Figure 4B:
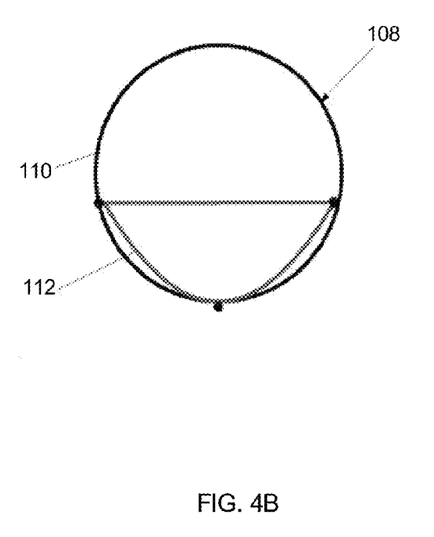
Figure 4C:
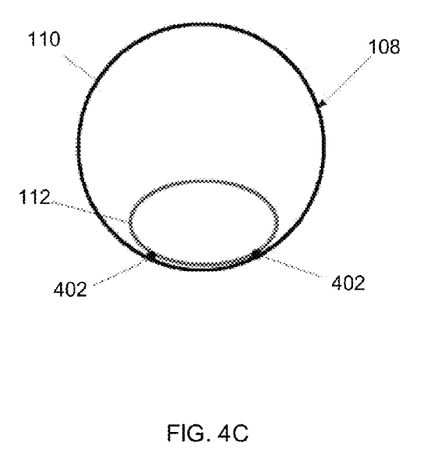
Figure 4D:
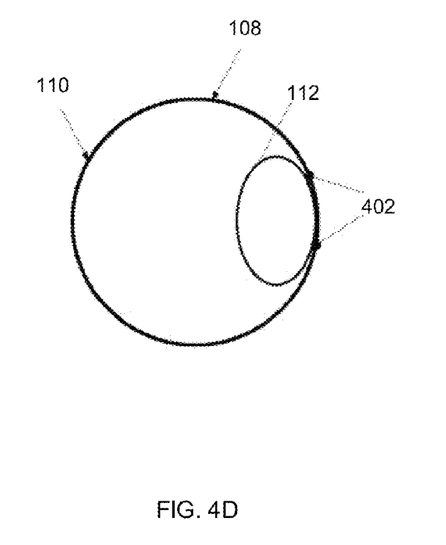

FIGS. 3A and 3B illustrate a side view and a detailed perspective view of an exemplary distribution pathway encapsulated by an exemplary reclamation pathway, in accordance with an embodiment of the present invention. In the present embodiment, a distribution pathway may perform the liquid distribution function. The distribution pathway may include a fully enclosed tube operable to pressurize and carry the liquid. A liquid inlet may join the distribution pathway with the reservoir. Those skilled in the art, in light of the present teachings, will recognize that irrigation piping, when used for drainage purposes, is typically placed below the ground, at or below the roots, so as to facilitate removal of water for purposes of conservation, collection of excess water, and preventing damage to crops from oversaturation. In some embodiments, the system pathway may include a plurality of corrugations 302 along the longitudinal axis to provide additional flexibility, such that the system pathway may be transported on circular reels.

FIGS. 4A, 4B, 4C, and 4D illustrate sectioned views of an exemplary distribution pathway encapsulated by an exemplary reclamation pathway, in accordance with an embodiment of the present invention. In the present embodiment, the system pathway an inner distribution pathway which runs coextensively with the reclamation pathway. The inner distribution pathway may be fabricated from a lighter, far less rigid and far less costly material, such as low-density polyethylene. In one embodiment of the present invention, the physical connections between the distribution pathway and the reclamation pathway may vary according to the requirements of any particular application. For example, without limitation, the required liquid flow capacity, the ratio of the available drainage volume to the irrigation volume, when and whether both active irrigation and active drainage are occurring simultaneously. Accordingly, various alternative configurations may be obtainable.

Figure 6A:
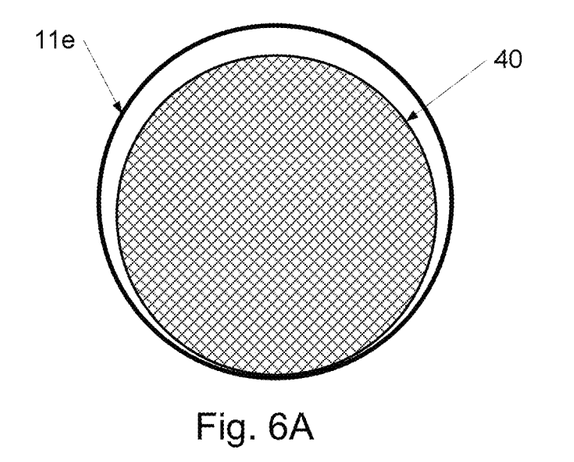
FIGS. 6A and 6B illustrate sectioned views of an exemplary distribution pathway encapsulated by an exemplary reclamation pathway, in accordance with an embodiment of the present invention.
Figure 6B:
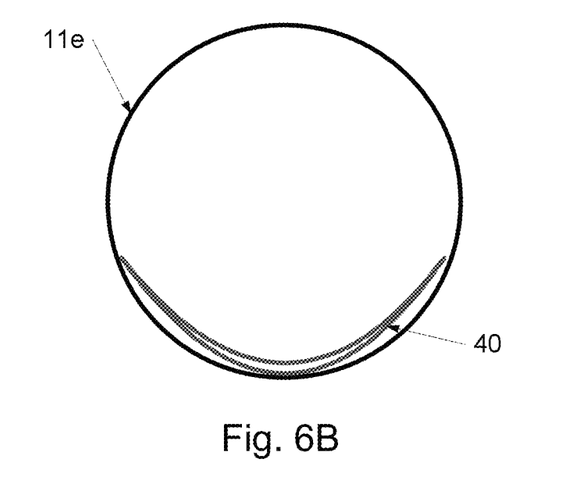

FIGS. 6A and 6B illustrate sectioned views of an exemplary distribution pathway encapsulated by an exemplary reclamation pathway, in accordance with an embodiment of the present invention. On FIG. 6A, 11e represents the outer rigid drainage pipe, while 40 represents the inner flexible pipe during irrigation or pressurization. On FIG. 6B 11e represents the outer rigid drainage pipe, while 40 represents the inner flexible pipe while not under pressure, making the pipe suitable to adequately perform the drainage function.

In one embodiment of the present invention, the distribution pathway may include a circular cross-section, when filled with the liquid and operating at pressure. The system may include a low pressure system, and accordingly the distribution pathway need not be of the substantially rigid and more costly variety. The distribution pathway and the reclamation pathway co-extruded, with a points of contact 402 extending along the common respective bottom dead center lines of the two pathways, with the distribution pathway making contact with the portions of the reclamation tube not having perforations. When not operating under pressure, the distribution pathway may collapse under its own weight, toward a flattened configuration. In some embodiments, the liquid may be intentionally drained from the distribution pathway to facilitate its collapse using know techniques, such as application of a vacuum. In some embodiments, the distribution pathway may be coextruded with the reclamation pathway in such a manner as to have three points of contact points, so as to define a generally triangular cross-sectional configuration, when under pressure. In some embodiments, the distribution pathway may be coextruded with the reclamation pathway in such a manner as to form an elliptical cross section cross-sectional configuration, when under pressure.

Figure 5A:
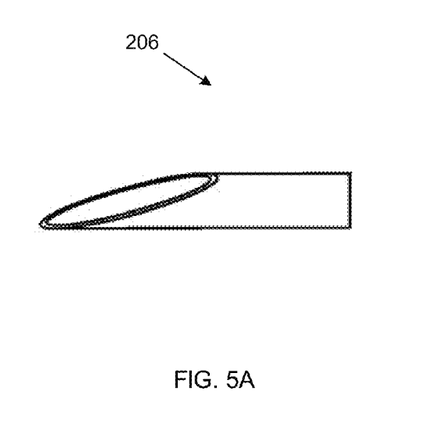
FIGS. 5A and 5B illustrate detailed perspective views of an end cap for joining co-terminating ends of the distribution pathway and the reclamation pathway.
Figure 5B:
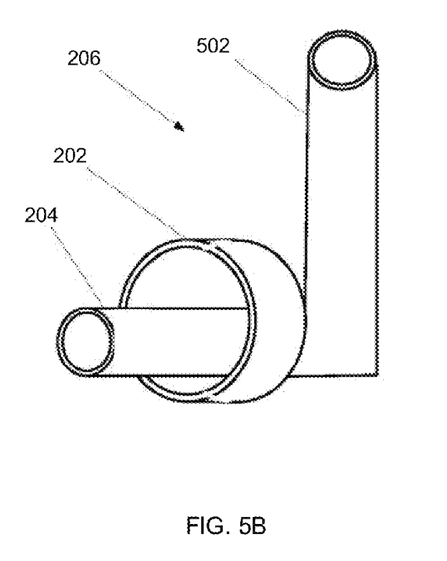

FIGS. 5A and 5B illustrate detailed perspective views of an end cap for joining co-terminating ends of the distribution pathway and the reclamation pathway. In the present embodiment, an end cap may be configured to join co-terminating ends of the distribution pathway and the reclamation pathway. The end cap construction for joining the co-terminating ends of the distribution pathway and the reclamation pathway. A coupler may join the pathways, and includes an interface with each pathway. A cap portion may close off a downstream end of the system pathway. A transition connector 502 may join the two pathways.

In one alternative embodiment, the pressurized distribution pathway may force the liquid in two directions through the distribution pathway to not only distribute the liquid, but also to help drain a ground surface from the liquid. In yet another alternative embodiment, the distribution pathway and the reclamation pathway comprise a single tube with a plurality of apertures, whereby thin film overlays the apertures to allow for pressurizing the liquid, and the film may be removed for drainage. In yet another alternative embodiment, the distribution system positions above the ground surface, such as for a gold course.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112(1), all claims must be supported by sufficient disclosure in the present patent specification, and any material known to those skilled in the art need not be explicitly disclosed. However, 35 USC §112(6) requires that structures corresponding to functional limitations interpreted under 35 USC §112(6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112(6) when such corresponding structures are not explicitly disclosed in the foregoing patent specification. Therefore, for any invention element(s)/structure(s) corresponding to functional claim limitation(s), in the below claims interpreted under 35 USC §112(6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112(6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112(6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112(6). Applicant(s) note that all the identified documents above which are incorporated by reference to satisfy 35 USC §112(6) necessarily have a filing and/or publication date prior to that of the instant application, and thus are valid prior documents to incorporated by reference in the instant application.

Having fully described at least one embodiment of the present invention, other equivalent or alternative methods of implementing a water distribution system that carries the water in a bi-directional direction and reuses the water according to the present invention will be apparent to those skilled in the art. Various aspects of the invention have been described above by way of illustration, and the specific embodiments disclosed are not intended to limit the invention to the particular forms disclosed. The particular implementation of the water distribution system that carries the water in a bi-directional direction and reuses the water may vary depending upon the particular context or application. By way of example, and not limitation, the water distribution system that carries the water in a bi-directional direction and reuses the water described in the foregoing were principally directed to irrigation systems with a distribution and reclamation pipe that join to form a circuitous path and recycle the water implementations; however, similar techniques may instead be applied to regulating the sewage system by pressurizing certain sewers, and collecting excess waste in others, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A land irrigation system, the land having a water reservoir, the land irrigation system comprising:
   (a) a plurality of reclamation pipes having perforated sections buried within the land, each reclamation pipe having a hollow bore which gravity drains into the water reservoir;
   (b) a plurality of irrigation pipes, each irrigation pipe being within a hollow bore of one of the plurality reclamation pipes;
   (c) a pump operatively communicating with the water reservoir and the irrigation pipes for pumping water into the irrigation pipes; and
   (d) a plurality of surface irrigators, each irrigator among the plurality of surface irrigators being selected from the group consisting of drip tube irrigators, sprinkler pipe irrigators and surge pipe field irrigators, each surface irrigator communicating with one of the irrigation pipes; wherein each reclamation pipe and each irrigation pipe is composed of plastic and comprises a plastic extrusion molded pipe.

2. The land irrigation system of claim 1 wherein each plastic extrusion molded irrigation pipe comprises a co-extruded pipe.

3. The land irrigation system of claim 2 wherein each co-extruded irrigation pipe has an oval cross-sectional shape.

4. The land irrigation system of claim 1 wherein the pump's operative communications with the irrigation pipes comprise at least a first water flow regulating valve.

5. A land irrigation system, the land having a water reservoir, the land irrigation system comprising:

(a) a plurality of perforated reclamation pipes buried within the land, each reclamation pipe having a hollow bore which gravity drains into the water reservoir;
(b) a plurality of irrigation pipes;
(c) a pump operatively communicating with the water reservoir and the irrigation pipes for pumping water from the water reservoir into the irrigation pipes; and
(d) a plurality of surface irrigators selected from the group consisting of drip tube irrigators, sprinkler pipe irrigators and surge pipe field irrigators, each surface irrigator communicating with one of the irrigation pipes; wherein each reclamation pipe and each irrigation pipe comprises extrusion molded plastic, the extrusion moldings of said pipes comprising plastic co-extrusions wherein said each irrigation pipe is formed as a single piece from a single co-extrusion process and mutually shares a side wall with said each reclamation pipe.

* * * * *